United States Patent [19]

Curwen

[11] Patent Number: 4,621,590
[45] Date of Patent: Nov. 11, 1986

[54] LIVESTOCK LEG RESTRAINER

[76] Inventor: Neil W. Curwen, RMB 997, Via Mt. Barker, Western Australia, Australia

[21] Appl. No.: 768,482
[22] PCT Filed: Dec. 6, 1984
[86] PCT No.: PCT/AU84/00255
  § 371 Date: Jul. 25, 1985
  § 102(e) Date: Jul. 25, 1985
[87] PCT Pub. No.: WO85/02534
  PCT Pub. Date: Jun. 20, 1985

[30] Foreign Application Priority Data

Dec. 6, 1983 [AU] Australia ............................ PG2705
Mar. 2, 1984 [AU] Australia ............................ PG3896
Aug. 2, 1984 [AU] Australia ............................ PG6338
Aug. 13, 1984 [AU] Australia ............................ PG6537
Sep. 18, 1984 [AU] Australia ............................ PG7196

[51] Int. Cl.$^4$ ............................................. A01K 15/04
[52] U.S. Cl. ................................................. 119/128
[58] Field of Search .......................... 119/98, 128, 126

[56] References Cited

U.S. PATENT DOCUMENTS 266,016 10/1882 Cook ..................................... 119/98
388,737 8/1888 Spieth ................................. 119/128
1,803,048 4/1931 Allen ................................... 119/128

Primary Examiner—Hugh R. Chamblee
Attorney, Agent, or Firm—Harness, Dickey & Pierce

[57] ABSTRACT

A livestock leg restraining means having a first member (11) formed with a set of at least two open-ended recesses (15) located in side by side relationship. A second member (12) is pivotally mounted to one end of the first member (11) by a hinge (13) and is movable to a first position closing each recess (15). A retaining means (14) is adapted to engage the first and second members (11, 12) when the second member (12) is in the closed position. The legs of an animal are intended to be received in the recesses (15) and retained therein by the second member (12) when the latter is in the closed position.

7 Claims, 3 Drawing Figures

LIVESTOCK LEG RESTRAINER

This invention relates to livestock leg restrainers.

It is an object of the invention to provide a live stock leg restrainer which may be used with live stock to hold two or more legs of an animal in order to restrain the animal during husbundary procedures, transportation or inspection.

In one form the invention resides in a livestock leg restrainer comprising a first member formed with a set of at least two open ended recesses located in side by side relationship and a second member pivotally mounted to one end of the first member and movable to a first position closing each recess, a retaining means adapted to engage the first and second members when the second member is in the closed position.

According to a preferred feature of the invention the pivotal interconnection between the first and second members permits selective slidable movements between the members to vary the area of the spaces defined in the recesses when the second member is in the closed position.

According to a further preferred feature of the invention said recesses are substantially U-shaped in configuration.

According to a further preferred feature of the invention the open faces of adjacent recesses are directed in opposed relation to each other.

According to a further preferred feature of the invention the second member is formed with recesses of a complementary configuration to the recesses of the first member.

The invention will be more fully understood in the light of the following description of one specific embodiment. The description is made with reference to the accompanying drawings of which:

Figure 1:
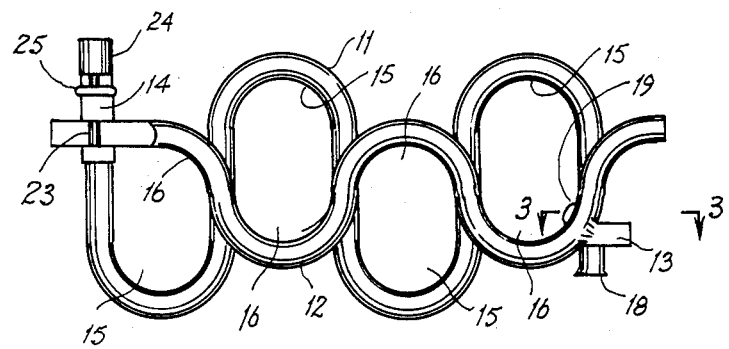
FIG. 1 is a plan view of the livestock leg restraining means of the embodiment in the closed position.

The embodiment is directed towards a leg restraining means for use with livestock and in particular sheep. The leg restraining means provides a means of engaging all four legs of an animal simply and effectively.

The embodiment comprises a first and second member 11 and 12 which are pivotally interconnected by a hinge 13 at one end. The other end of the first member supports a locking means 14 which is capable of engaging with the second member 12 when it is engaged in the closed position with the first member 11. The first member 11 has a convoluted configuration whereby it defines four U-shaped recesses 15 each having an open face whereby the open face of adjacent recesses is directed in opposed opposite directions. The second member 12 also has a convoluted configuration, between the hinge 13 and the other end which is engageable with the locking member 14, to define recesses 16 which are substantially complementary with the recesses 15 of the first member. It is the complementary nature of the recesses 15 and 16 of the first and second member 11 and 12 respectively by which a space is defined which conforms substantially to the configuration of the leg of an animal.

To accommodate for a variation in leg dimensions the second member 12 is slidably adjustable on the first member 11 through the hinge 13 to vary the dimensions of the space defined by the recesses 15 and 16. The hinge 13 comprises a slot formed on the one end of the second member 12 which receives the one end portion of the first member 11. The end 18 of the end portion of the first member 11 is enlarged to prevent disengagement of the end portion from the slot 13 while a lug 19 is fixed to the end portion on the side of the slot 17 remote from the end 18 to prevent movement of the slot along the first member 11.

Figure 3:
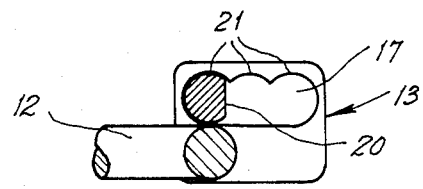
FIG. 3 is a sectional view along the line 3—3 of FIG. 1.
Figure 2:
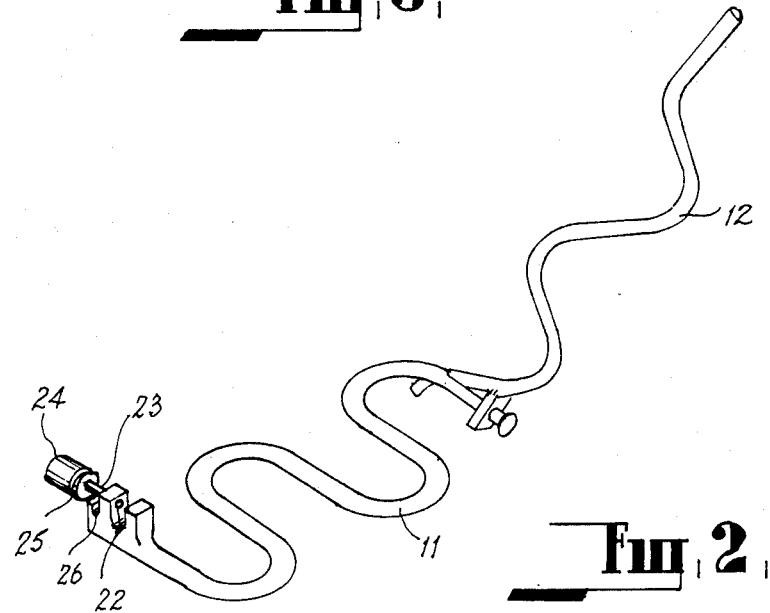
FIG. 2 is an isometric view of the leg restraining means of the embodiment in the open position.

The slot 17 is formed with three spaced notches 21 the dimensions of which corresponds substantially with the external dimensions of the one end portion which is substantially circular. One side 20 of the end portion is flattened such that the transverse dimensions between the one side and the opposite side corresponds substantially to the minimum dimensions of the slot between the notches 21. To effect slidable movement of the members at the hinge the flattened one side 20 is placed such that the minimum dimension of the end portion is in alignment with the zones between the notches 21 which is effected when the second member 12 is substantially perpendicular to the first member 11. When the second member 12 is parallel with the first member 11 the end portion is snugly engaged in one of the notches 21 as shown at FIG. 3. The slidable movement of the end portion of the first member 11 in the slot 17 varies the relative position of the recesses 16 of the second member to the recesses 15 of the first member and the area of the space defined thereby.

The locking member 14 which is mounted to the other end of the first member 11 comprises an open ended slot 22 which is shaped to receive the other end of the second member 12 and is associated with a pin member 23 having an enlarged head 24. The pin 23 is slidably mounted be movable across the slot 22 to entrap the other end of the second member in the slot when engaged therewith. To prevent the inadvertent disengagement of the pin member 23 from engagement across the slot 22 the pin member is formed with a semi circular lug 25 adjacent the enlarged head 24 which is engageable with a second open ended slot 26 when the pin is engaged across the slot 22. By rotation of the pin 23 the semi circular lug 25 can be either engaged or disengaged from the slot 26 to ensure retention of the pin over the slot 22 or to facilitate removal of the pin respectively.

In use the leg restraining means is opened such that the members are perpendicular and the desired spacing between the recesses 15 and 16 of the first and second member 11 and 12 is obtained by movement of the end portion of the first member within the slot 17 on the second member. The legs of the animal are then engaged in the recesses 15 of the first member 11 and the second member 12 is lowered into parallel relationship with the first member 11 such that its other end is engaged in the slot 22 of the first member. The pin 23 is then engaged across the slot 22 and is rotated through 180° such that the semi circular lug is received within the second slot 26. At this position it is not possible for the second member to become disinadvertenly dislodged and the animal is positively restrained. To release the animal the pin 23 is rotated through 180° to disengage the semi circular lug 25 from the second slot 26 and the pin is then disengaged from across the slot 22 to allow the second member 12 to be pivotted away from the first member 11 thus releasing the legs of the animals without any possibility of the animal being caught and subsequently damaged by any unreleased element.

It should be appreciated that if desired the second member need not have take the convoluted form as shown in the representations and may in fact be substantially co-linear or may be only slightly convoluted.

In addition the first and second members may be formed from rod shaped material which is bent to the desired configuration alternatively the first and second members may be may be moulded.

It should also be appreciated that the hinge between the first and second members need not take the particular form described in relation to the embodiment and similarly the retaining means between the second and first member need not take the particular form described in relation to the embodiment.

The claims defining the invention are as follows:

I claim:

1. A livestock leg restraining means comprising a first member formed with a set of at least two open ended oppositely facing, adjacent recesses located in side by side relationship and second member pivotally connected to one end of the first member and movable to a first position closing each recess and a second position opening each recess to receive the legs of an animal, and retaining means for selectively locking the first and second members when the second member is in the closed position.

2. A leg restraining means as claimed at claim 1 wherein said second member is formed with recesses complementary to the recesses of a first member.

3. A leg restraining means as claimed at claim 1 wherein said recesses are substantially U-shaped in configuration 4. A leg restraining means as claimed at claim 3 wherein the open faces of adjacent recesses are directed in opposite directions.

5. A leg restraining means as claimed at claim 3 wherein said second member is formed with recesses of a complementary nature to the recesses of a first member.

6. A leg restraining means as claimed at claim 1 wherein the pivotal interconnection between the first and second members is provided by a hinge for selective slidable movement between the members to vary the area of the spaces defined between the recess of the first member and the second member when the second member is in the closed position.

7. A leg retaining means as claimed at claim 6 wherein said hinge comprises a slot on one member formed with notches along its length and a pivot shaft on the other member receivable in the slot, the shaft being dimensioned to be pivotally received in each notch and having a reduced diameter portion which is engagable with the space between the slots when the members are not in the closed position to allow movement of the shaft between the notches.

* * * * *